May 16, 1967

Z. FOX 3,319,642

BREAK-AWAY COUPLING WITH A TRIGGERED VALVE

Filed June 4, 1964

INVENTOR.
ZOLA FOX

BY
William R. Wright Jr.
AGENT

INVENTOR.
ZOLA FOX

3,319,642
BREAK-AWAY COUPLING WITH A TRIGGERED VALVE
Zola Fox, Verona, N.J., assignor to Thiokol Chemical Corporation, Bristol, Pa., a corporation of Delaware
Filed June 4, 1964, Ser. No. 372,488
20 Claims. (Cl. 137—68)

This invention relates in general to inter-stage coupling means for the liquid propellant supply lines of multi-stage rocket type vehicles and has particular reference to a combination of frangible peripheral connective sealing means for contiguous stages and disconnect valve means for one of the stages which will be closed automatically preceding rupture of said peripheral connective sealing means upon separation of both stages.

Prior to my present invention, the construction and arrangement of the connective seal for the fluid supply line coupling means and the rupturing means therefor have been designed to cause instantaneous rupture of said connective seal throughout the periphery thereof, i.e., a full peripheral shear. A serious disadvantage of the prior are connective sealing and rupturing means is the great force which must be exerted in order to break the seal.

With the above mentioned disadvantage in mind, it is the primary object of my present invention to provide the mated ends of the co-operative sub-assemblies of an inter-stage propellant conduit coupling with a frangible connective seal ring whose marginal portions are secured in hermetically sealed manner to the respective sub-assemblies together with means responsive to axial separation of both sub-assemblies that will progressively strip one marginal portion of the connective seal ring from the other portion in a smooth and steady progressive rupturing action around the periphery of the coupling.

Another object of the invention is to provide a coupling assembly combining my improved construction of connective frangible sealing means in the after sub-assembly thereof (with reference to the direction of rocket flight) with a spring-loaded propellant flow controlling valve in the forward sub-assembly and means to lock the said valve in open position prior to rupturing of the connective seal and then to trigger release of the valve locking means automatically at the instant rupture of the connective seal commences to permit the valve operating spring to force the valve closed before the connective seal becomes broken, whereby loss of propellant fluid from the conduit carried by the forward sub-assembly will be prevented.

It is also an object of the invention to make the after sub-assembly of the coupling flexible to allow for any misalignment of the two sub-assemblies likely to occur at the time of jettisoning the after stage of the rocket such as otherwise might interfere with the seal rupturing action and timely valve operation.

Further objects, advantages and features of the invention will become apparent as the following specific description is read in connection with the accompanying drawings, in which.

Figure 1:
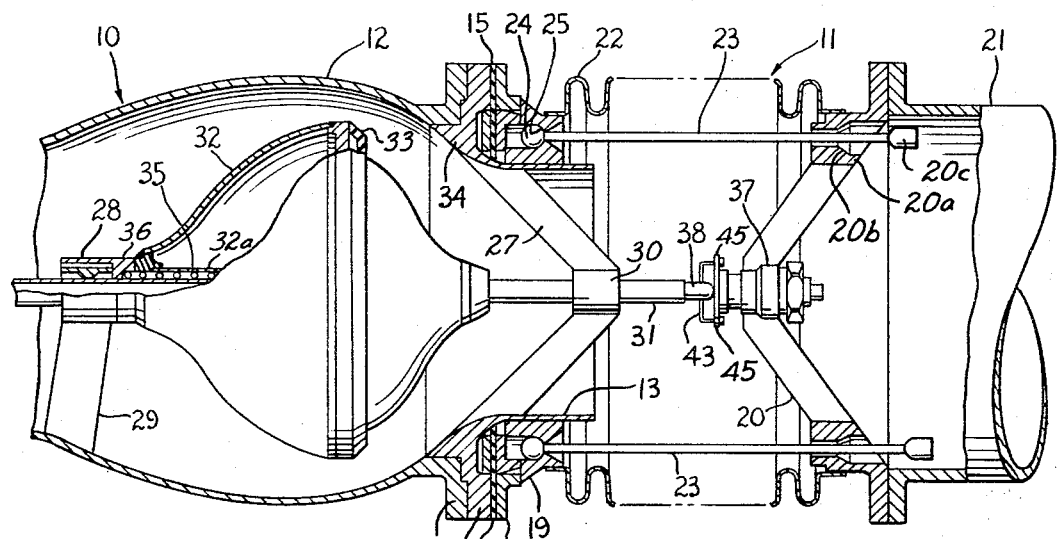
FIGURE 1 is an axial sectional view of the conduit coupling assembly of a multi-stage rocket constructed in accordance with the invention, showing the component forward and after sub-assemblies in perfect alignment prior to staging, with the connective frangible seal ring intact and the valve in the forward sub-assembly locked in spring-loaded static open position.

Referring now in detail to the drawings, wherein like reference characters designate corresponding parts in the several views, it will be observed that the complete coupling assembly for use in two adjoining stages of a rocket type vehicle (not shown) comprises two mated sub-assemblies 10 and 11. In this particular application of the invention, it may be assumed that the sub-assembly 10 will be incorporated in construction of the forward stage of the vehicle whereas the sub-assembly 11 will be in the after, or jettisonable, stage. However, it will be understood that the coupling is capable of useful employment in various classes of fluid conducting pipe lines, or conduits, in which it is desired to be able to disconnect one coupling sub-assembly from one another only after a flow control valve in the said other sub-assembly has been safely closed. Because of the wide application of my invention, sub-assembly 10 will be called hereinafter the "first sub-assembly" and sub-assembly 11 will be known as the "second sub-assembly."

Figure 3:
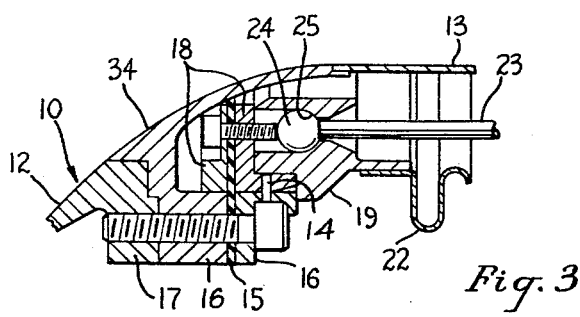
FIGURE 3 is a fragmentary large-scale axial section of the connective frangible seal arrangement in intact condition.

In the illustrated embodiment for use in rocket type vehicles, first sub-assembly 10 includes a rigid tubular lateral wall 12 of streamline internal form that has a substantially cylindrical inner end portion 13 telescopically projecting slightly into the inner end of second sub-assembly 11. The respective sub-assemblies 10 and 11 have their contiguous inner ends joined separably in mated relation by connective sealing means including a radially flat frangible seal ring 15. An outer pair of axially opposed clamping rings 16—16 embrace the outer marginal portion of frangible seal ring 15 and preferably are secured to the inner end of flange 17 of first sub-assembly 10. A co-operative inner pair of similarly axially opposed clamping rings 18 (FIGURE 3) arranged in shearing relation to outer clamping rings 16—16 embrace the inner marginal portion of frangible seal ring 15 and preferably are secured to the inner end flange 19 of second sub assembly 11. A plurality of peripherally spaced, radial, soft, shear pins 14 connect the inner clamping rings 18 to the outer clamping rings 16—16 to prevent accidental rupture of the connective seal ring 15 during shipment, stacking, and normal handling. The radially outer surface of the axially rearward clamping ring 18 of the inner pair is spherically machined to preclude any possibility of hang-up on demate, whereas the contiguous co-operative clamping ring 16 of the outer pair is machined with a sharp edge to facilitate shearing of the frangible connective seal ring 15.

The entire organization of frangible seal ring 15, outer clamping rings 16—16, inner clamping rings 18—18, and annular flanges 17 and 19 is such that a hermetic seal between the interior of sub-assemblies 10 and 11 and the lateral cavity of the rocket type vehicle is insured so long as the said seal ring 15 is intact.

Second sub-assembly 11 includes a rigid spider 20 that is rearwardly remote from annular flange 17 and is adapted to be connected removably to the front end of any trailing section 21 of the jettisonable stage. In order to allow for misalignment of the respective first and second sub-assemblies 10 and 11 during the ultimate staging operation, the lateral wall 22 of second sub-assembly 11 is in the form of a low rate bellows of flexible material. Incidentally, it is essential that the composition of lateral walls 12 and 22 of both sub-assemblies and of all other parts of both sub-assemblies which will be exposed to the fluid being conducted therethrough shall be compatible with the said fluid, especially if it be of a cryogenic or corrosive nature.

In order to provide for progressive rupture of connective frangible seal ring 15 around the periphery of second sub-assembly 11 from a starting point to a point of completion, I have employed a series of attenuated pull members 23 that are graduated in effective length from short to long. There are preferably three of these pull members 23 in the form of metallic rods made of high fatigue strength material, such as shot peened beryllium copper, to withstand flow induced or flight vibration. The three pull rods 23 actually are equal in overall length but capable of being varied in effective length. These rods extend substantially axially between annular flange 19 and spider 20 and are uniformly spaced 120 degrees apart around the circumference of a second sub-assembly 11. The inner end of each pull rod 23 has a ball-type head 24 that fits a spherical socket 25 in annular flange 19, whereas the opposite end of said pull rod has a loose fitting connection with spider 20 at the outer end of sub-assembly 11 to permit adjustment of the effective length of each rod. Three equally spaced anchoring tubes 20a extend axially through spokes of spider 20 and have inturned annular abutment flanges 20b at their inner ends. The outer (after) end of each pull rod 23 is longitudinally slidable in the orifice of flange 20b of a corresponding anchoring tube 20a, and a limiting nut 20c is threaded on the said pull rod in rear of said flange. By adjusting nut 20c, the effective length of each pull rod may be adjusted.

Figure 2:
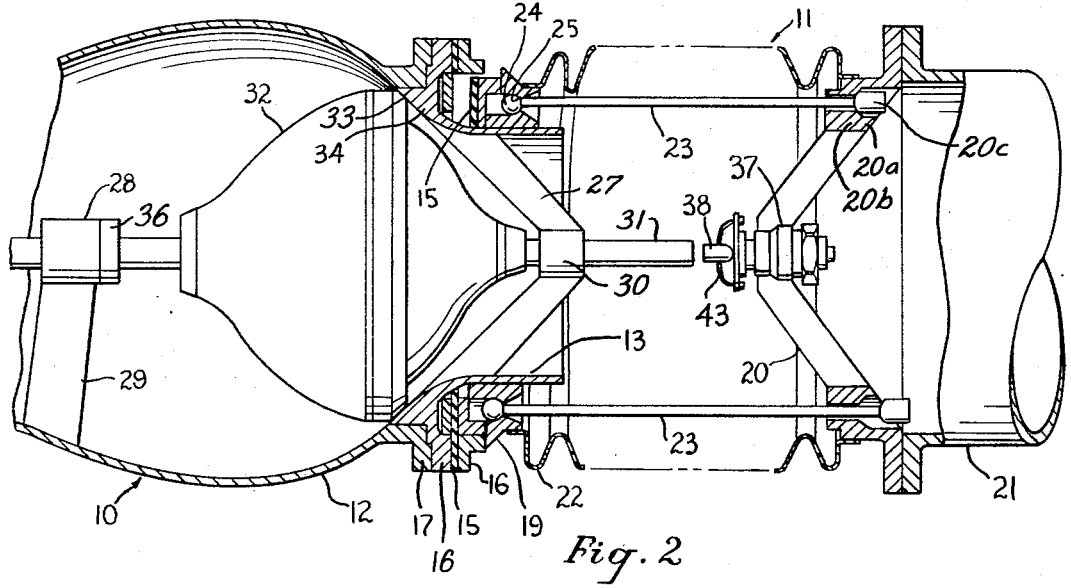
FIGURE 2 is a view similar to FIGURE 1 but showing the propellant flow control valve closed and the connective frangible seal broken.

First sub-assembly 10 includes a dished spider 27 rigid with the inner end portion of lateral wall 12 and protruding into second sub-assembly 11. Remote from spider 27 in the direction opposite to second sub-assembly 11 there is a bearing 28 supported by a bracket arm 29 extending radially inward from lateral wall 12 of sub-assembly 10 in axial alignment with the hub 30 of spider 27. An axial poppet guide shaft 31 is mounted for axial sliding movement in bearing 28 and spider hub 30. A hollow movable poppet valve member 32 has a central bearing opening 32a fixedly receiving guide shaft 31, i.e. valve member 32 reciprocates axially with poppet guide shaft 31 in its bearings. Poppet valve member 32 has an annular peripheral movable seat 33 facing toward second sub-assembly 11 for valve-closing engagement with an oppositely facing annular stationary seat 34 provided on the inner face of the convergent-divergent inner end portion of lateral wall 12 of first sub-assembly 10 (FIGURE 2). A powerful spiral compression spring 35 acting against and to close poppet valve member 32 on its seat 34 encircles guide shaft 31 and acts against annular shoulder 36 provided on said poppet guide shaft in interposed relation to bearing 28. This valve-closing spring 35 is checked in tensioned valve-open position (FIGURE 1) by a lock mechanism now to be described.

Figure 4:
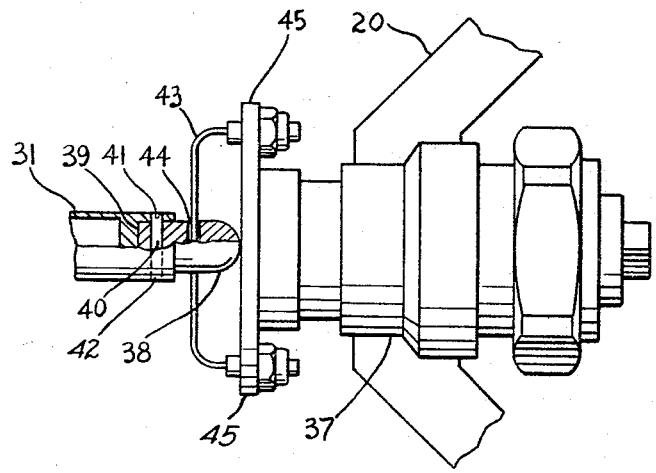
FIGURE 4 is a fragmentary large-scale axial section of the valve locking mechanism and the triggering means therefor.
Figure 5:
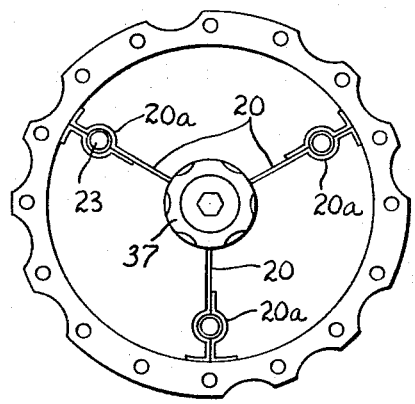
FIGURE 5 is a rear end view of the second sub-assembly.

Inside second sub-assembly 11, a cylindrical floating lock member 37 constitutes the hub of spider 20 and is in such a position that, when poppet valve member 32 is in open position (FIGURE 1), a cylindrical plug 38 detachably seated in a socket 39 (FIGURE 4) of corresponding form in the end of poppet guide shaft 31 that projects into second sub-assembly 11, will bear against the inner end face of said lock member and thereby be locked against valve closing movement. A shear pin 40 is fitted in aligned radial holes 41 and 42, respectively, in poppet guide shaft 31 and plug 38 to secure said plug against detachment pending intentional separation of sub-assemblies 10 and 11 at the moment of staging action.

It should be apparent that plug 38 serves as an axial extension of poppet shaft 31 and holds poppet valve member 32 in what may be termed "fully cocked" open position under maximum spring loading pressure. In this respect, plug 38 functions like the sear of a firearm. "Triggering" of the poppet valve accordingly may be effected by shearing pin 40. This is done automatically at the instant staging commences and second sub-assembly 11 is separated from first sub-assembly 10, through the agency of a flexible wire 43 that is threaded through a radial hole 44 in plug 38 and has its ends anchored to diametrical arms 45—45 projecting outwardly from the inner (forward) end of lock member 37. When the two sub-assemblies separate, wire 43 jerks plug 38 out of terminal socket 39 in poppet shaft 31, while shearing pin 40. This triggering action frees poppet guide shaft 31 to move first through a short distance equal to that of protrusion of plug 38 from the end of said shaft and then with accelerated speed all the way into the closed position of poppet valve member 32.

In addition to its lock triggering function for poppet valve 32, lock member 37 provides means of adjusting out internal tolerances so that the poppet guide shaft extension (plug 38) just contacts said lock member prior to installation. Powerful spring 35 permits the poppet valve position and hydraulic characteristics to be fixed over a specified range of installation clearances.

OPERATION

Assuming that the time has arrived for staging of adjoining stages of a rocket equipped with the fluid conduit coupling of my invention by jettisoning the after section containing second sub-assembly 11, the necessary staging action is put into effect by conventional means, such as the firing of a booster power plant in the forward stage. Thereupon, spider 20 of second sub-assembly 11, due to the inertia of the latter, will exert rearward pull on the respective pull rods 23 in the succession for which designed. The short one, i.e., the one with limiting nut 20c screwed up most closely to flange 20b, will act first to commence rupture of connective frangible seal ring 15 at one point in its periphery. Then, the pull rod 23 of intermediate effective length will come into play, followed by the longest pull rod. This describes the breaking of the connective seal, but closing of the poppet valve 32 will have been effected automatically immediately prior to the seal rupture through action of the floating lock member 37. At the instant of separation of second sub-assembly 11 from first sub-assembly 10, wire 43 will have jerked plug 38 out of the terminal socket 39 in poppet guide shaft 31, while shearing pin 40. As a result, poppet guide shaft 31 will have become shortened and valve closing spring 35 will have slammed poppet valve body 32 against its seat. Consequently, no fluid can leak from the first subassembly 10 of the line.

While there have been shown and described and pointed out the fundamental novel features of this invention as applied to a few structural embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. In a fluid conduit coupling assembly, the combination of: a first sub-assembly and a second sub-assembly, of which sub-assemblies both are of tubular form with lateral walls and arranged in substantially axial mated alignment with contiguous inner ends and axially remote outer ends to provide normally intercommunicating fluid flow passages; a radially flat connective shear seal ring of frangible material interposed between the contiguous ends of said sub-assemblies; an outer pair of axially opposed clamping rings embracing the radially outer marginal portion of said connective shear seal ring and being secured in hermetically sealing manner to the lateral wall of one of said sub-assemblies; an inner pair of axially opposed clamping rings embracing the radially inner marginal portion of said connective shear seal ring and being secured in hermetically sealing manner to the lateral wall of the other of said sub-assemblies; and shear seal rupturing means responsive to axial separation of said sub-assemblies constructed and arranged to cause rupture of the connective shear seal ring progressively around the circumference thereof from a starting point to completion.

2. The invention defined in claim 1, wherein the means for rupturing the connective seal comprises a series of separate attenuated pull members of different lengths; wherein each of said pull members has one end anchored to the second sub-assembly at a point remote from the inner end thereof and its opposite end anchored to the clamping rings that are secured to said second sub-assembly; and wherein the several pull members are arranged substantially lengthwise in relation to the axis of the second sub-assembly and with the respective lengths thereof graduated progressively from short to long peripherally around said axis.

3. The invention defined in claim 2, wherein the second sub-assembly includes a flexible lateral wall portion that permits misalignment with respect to the first sub-assembly.

4. The invention defined in claim 3, wherein the lateral wall portion of the second sub-assembly is of bellows construction.

5. The invention defined in claim 1, wherein the second sub-assembly includes a flexible lateral wall portion that permits misalignment with respect to the first sub-assembly.

6. The invention defined in claim 5, wherein the flexible lateral wall portion of the second sub-assembly is of bellows construction.

7. The invention defined in claim 1, wherein plural peripherally spaced radial safety shear pins connect the inner clamping rings to the outer clamping rings to prevent accidental rupture of the connective seal ring during shipment, stacking, and normal handling.

8. The invention defined in claim 1, wherein the means for rupturing the connective seal comprises a series of separate attenuated pull members of different lengths; wherein each of said pull members has one end anchored to the second sub-assembly at a point remote from the inner end thereof and its opposite end anchored to the clamping rings that are secured to said second sub-assembly; wherein the several pull members are arranged substantially lengthwise in relation to the axis of the second sub-assembly and with the lengths thereof graduated progressively from short to long peripherally around said axis; and wherein the portion of the second sub-assembly to which corresponding ends of the pull members are anchored is a rigid annular spider member.

9. The invention defined in claim 8, wherein the second sub-assembly includes a flexible lateral wall portion extending between the rigid annular member and the inner end of said sub-assembly to permit misalignment thereof with respect to the first sub-assembly.

10. The invention defined in claim 9, wherein the flexible lateral wall portion of the second sub-assembly is of bellows construction.

11. The invention defined in claim 1, wherein the first sub-assembly includes valve means to control flow of fluid through its flow passage, and spring means tending to bias said valve means into closed position; and wherein the second sub-assembly includes means to lock the valve means of the first sub-assembly releasably in open position, and means instantly responsive to commencement of axial separation of said first and second sub-assemblies before rupture of the connective seal ring to trigger release of the valve locking means, whereby said valve will be closed prior to rupture of said connective seal ring.

12. The invention defined in claim 11, wherein the first sub-assembly has an axial orifice with a stationary seat facing away from the second sub-assembly; wherein the valve means of said first sub-assembly is a poppet type valve including a spider with a central hub affixed to the lateral wall of said first sub-assembly, an axial poppet guide shaft longitudinally slidable in the spider hub and having a cylindrical socket in its inner end, said movable poppet valve member being fixed to and carried by said poppet guide shaft for movement axially therewith and having a movable annular seating surface for engagement with said stationary seat in closed position; wherein the second sub-assembly locking means for the movable poppet valve member includes a cylindrical plug removably fitted in the said socket, a shearable pin piercing said plug and shaft, and a spider affixed to the outer end of the second sub-assembly and having a central hub normally bearing against the outer end of the said shaft plug in the open condition of the movable poppet valve member to hold it open; and wherein said instantly responsive means for said lock means includes a wire piercing said shaft plug diametrically and having its ends anchored to the spider hub.

13. The invention defined in claim 1, wherein the means for rupturing the connective seal ring comprises a series of separate attenuated pull members of different effective lengths; wherein each of said pull members has one end anchored to the second sub-assembly at a point remote from the inner end thereof and its opposite end anchored to the clamping rings that are secured to said second sub-assembly; wherein the several pull members are arranged substantially lengthwise in relation to the axis of the second sub-assembly and with the respective lengths thereof graduated progressively from short to long peripherally around said axis; and wherein means is provided to adjust the effective length of each pull member.

14. The invention defined in claim 13, wherein each pull member is a rod with a ball at its inner end; wherein the clamping ring that is secured to the second sub-assembly has a spherical socket opening inwardly and engaged with said ball of the pull member; wherein the outer portion of the second sub-assembly includes an axially extending anchoring tube to slidably receive each of said pull rods and having an inturned stop flange at the inner end thereof, and an effective length adjusting nut threaded on the rear end of each pull rod for engagement with the corresponding tube flange, whereby by relative adjustment of the respective nuts the comparative effective lengths of the several pull rods may be adjusted.

15. In a fluid conduit coupling assembly, the combination of: a first sub-assembly and a second sub-assembly each of tubular form in axial alignment and having contiguous ends for the passage of fluid therethrough; a frangible shear seal ring interposed between said ends and having annular portions hermetically connected to each; and shear seal rupturing means responsive to axial separation of said sub-assemblies to effect progressive and complete circumferential rupture of said seal ring.

16. The combination recited in claim 15 wherein said rupturing means comprises a series of circumferentially disposed, axially extending, pull members of progressively different lengths each having one end anchored to one of said annular portions and its other end anchored at a spaced point therefrom to one of said sub-assemblies.

17. The combination recited in claim 15 wherein the tubular form of one of said sub-assemblies includes a flexible lateral wall portion that permits misalignment of said sub-assemblies.

18. The combination recited in claim 17 wherein the tubular form of one of said sub-assemblies includes a flexible lateral wall portion that permits misalignment of said sub-assemblies.

19. The combination recited in claim 18 wherein said flexible lateral wall portion encloses said pull members.

20. The combination recited in claim 15 wherein one of said sub-assemblies includes valve means to control flow of fluid therethrough and spring means biasing said valve means into closed position; and the other of said sub-assemblies includes means holding said valve means in open position, and means instantly responsive to commencement of axial separation of said sub-assemblies before rupture of said seal ring to effect release movement of said valve holding means whereby said valve means closes prior to rupture of said seal ring.

References Cited by the Examiner

UNITED STATES PATENTS

| | | | |
|---|---|---|---|
| 1,665,391 | 4/1928 | Willoughby | 137—69 |
| 2,906,280 | 9/1959 | Mount | 137—68 |
| 3,056,613 | 10/1962 | Dale | 285—3 |

WILLIAM F. O'DEA, *Primary Examiner.*

R. GERARD, *Assistant Examiner.*